(12) United States Patent
Cheng et al.

(10) Patent No.: US 11,698,497 B2
(45) Date of Patent: Jul. 11, 2023

(54) FIBER HOLDER FOR USE WITH OPTICAL SUBASSEMBLY MODULES

(71) Applicant: Applied Optoelectronics, Inc., Sugar Land, TX (US)

(72) Inventors: Hao-Chiang Cheng, Houston, TX (US); Kai-Sheng Lin, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 155 days.

(21) Appl. No.: 17/192,062

(22) Filed: Mar. 4, 2021

(65) Prior Publication Data
US 2022/0283390 A1   Sep. 8, 2022

(51) Int. Cl.
  *G02B 6/42*    (2006.01)
  *H04B 10/60*   (2013.01)
  *H04B 10/40*   (2013.01)

(52) U.S. Cl.
  CPC .......... *G02B 6/4209* (2013.01); *G02B 6/4215* (2013.01); *G02B 6/4246* (2013.01); *H04B 10/40* (2013.01); *H04B 10/60* (2013.01)

(58) Field of Classification Search
  CPC ...... H04B 10/40; H04B 10/60; G02B 6/4246; G02B 6/4215; G02B 6/4209
  See application file for complete search history.

(56) References Cited

U.S. PATENT DOCUMENTS

| 11,454,771 | B2* | 9/2022 | Mizuno | G02B 6/4277 |
| 2008/0292322 | A1* | 11/2008 | Daghighian | H04B 10/40 398/192 |
| 2009/0010600 | A1* | 1/2009 | Kim | G02B 6/4246 385/90 |
| 2012/0219263 | A1* | 8/2012 | Beamon | H05K 1/0274 29/834 |

(Continued)

FOREIGN PATENT DOCUMENTS

| CN | 102243343 A | * 11/2011 | ............. G02B 6/421 |
| CN | 111679379 A | * 9/2020 | ......... H04B 10/2581 |

(Continued)

OTHER PUBLICATIONS

"Corning ClearCurve ZBL Optical Fiber", Product Information, Corning Incorporated, www.corning.com/opticalfiber, 2014, 2 pgs.

(Continued)

*Primary Examiner* — Thomas A Hollweg
*Assistant Examiner* — Mary A El-Shammaa
(74) *Attorney, Agent, or Firm* — Grossman Tucker Perreault & Pfleger, PLLC; Norman S. Kinsella

(57) ABSTRACT

An optical fiber holder is disclosed herein that includes at least one confinement slot for routing intermediate optical fibers within a housing of an optical assembly module, and preferably, a plurality of confinement slots for maintaining a target/nominal fiber bending radius for one or more intermediate optical fibers within the housing. Preferably, the optical fiber holder is disposed within the housing of an optical subassembly between an optical component, e.g., a (Continued)

TOSA arrangement and/or ROSA arrangement, and optical coupling receptacles, e.g., LC coupling receptacles, for optically coupling with external fibers for sending and/or receiving optical signals.

18 Claims, 9 Drawing Sheets

(56) References Cited

U.S. PATENT DOCUMENTS

| | | | |
|---|---|---|---|
| 2012/0237171 A1* | 9/2012 | Oki | G02B 6/428 |
| | | | 385/92 |
| 2018/0348456 A1* | 12/2018 | Ho | G02B 6/421 |
| 2020/0195350 A1* | 6/2020 | Matsui | G02B 6/4281 |
| 2020/0295836 A1* | 9/2020 | Ishii | H04B 10/2581 |
| 2021/0072469 A1* | 3/2021 | Liu | G02B 6/4246 |
| 2021/0333495 A1* | 10/2021 | Wang | G02B 6/4269 |

FOREIGN PATENT DOCUMENTS

| | | | | |
|---|---|---|---|---|
| CN | 112444924 A | * | 3/2021 | G02B 6/4214 |
| CN | 113204080 A | * | 8/2021 | G02B 6/4221 |

OTHER PUBLICATIONS

"Bend-Optimized Single-Mode Fibers: Not just for the indoors anymore", OFS Fitel, LLC, Publication date Mar. 2014, 5 pgs.
G. Scott Glaesemann, Paulo Dainese, Merrion Edwards & Jabulani Dhliwayo, "The Mechanical Reliability of Corning Optical Fiber in Small Bend Scenarios", Corning, Dec. 2007, 7 pgs.

* cited by examiner

FIBER HOLDER FOR USE WITH OPTICAL SUBASSEMBLY MODULES

TECHNICAL FIELD

The present disclosure generally relates to optical communications, and more particularly, to a fiber holder for use in optical module housings to route intermediate optical fibers disposed therein.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, insertion loss, and manufacturing yield.

Optical transceivers can include one or more transmitter optical subassemblies (TOSAs) and receiver optical subassemblies (ROSAs) for the purpose of transmitting and receiving optical signals. As channel density becomes an increasingly important aspect of optical transceivers, the ability scale-down while maintaining nominal transceiver performance raises numerous non-trivial challenges.

BRIEF DESCRIPTION OF THE DRAWINGS

These and other features and advantages will be better understood by reading the following detailed description, taken together with the drawings wherein.

DETAILED DESCRIPTION

Optical transceivers can include receiver optical subassemblies (ROSAs) that are configured to receive multiple channel wavelengths via a common fiber and de-multiplex the same for detection, amplification and conversion purposes. To de-multiplex a received signal, such as a wavelength division multiplexed (WDM) signal, a ROSA may use an arrayed waveguide grating (AWG) device to separate channel wavelengths and to provide the separated channel wavelengths to associated detector devices such as photodiodes. To couple the received optical signal into an AWG device, transceivers can include a length of intermediate fiber that extends from, for example, an LC connector receptacle to a coupling port of the AWG device. In some cases, the intermediate fiber is communications grade optical fiber, e.g., compliant with IEC 60793-2-10 and 60793-50, which is based on a glass or "cladding" having a diameter of about 125 microns (μm) or less. The region at the center of the fiber that carries the optical signal is generally referred to as the "core" and may measure from a few microns to 62.5 μm in diameter, for example. The optical fiber properties, e.g., the core, refractive index profile and so on, that define optical performance are generally referred to as the "waveguide" although the term also generally applies to the entire optical fiber.

The properties of an optical fiber govern the extent of bending prior to the introduction of loss due to macro and/or micro bending. Macro-bending of an optical fiber, for example, references bends generally visible to the human eye which can introduce signal attenuation. Such bends can cause light to "leak out" an increasing amount as the bend becomes more acute and alters the refractive index profile of the optical fiber. On the other hand, micro-bending generally refers to small, potentially imperceptible, radius bends of the fiber core caused by, for example, lateral contact with surfaces in the transceiver housing and twists in the fiber optic cable. Manufacturers generally suggest that the minimum (Rmin) bending radius for an optical fiber be about no less than 15-20× the diameter of the optical fiber to avoid introducing macro and/or micro bending and maintain nominal performance. Stated differently, an acute bending radius that is less than 15× the diameter of the optical fiber, for example, may introduce unacceptable power loss. For instance, a fiber diameter of 0.25 millimeters (mm) can include a minimum bending radius of 4 mm.

Figure 1:
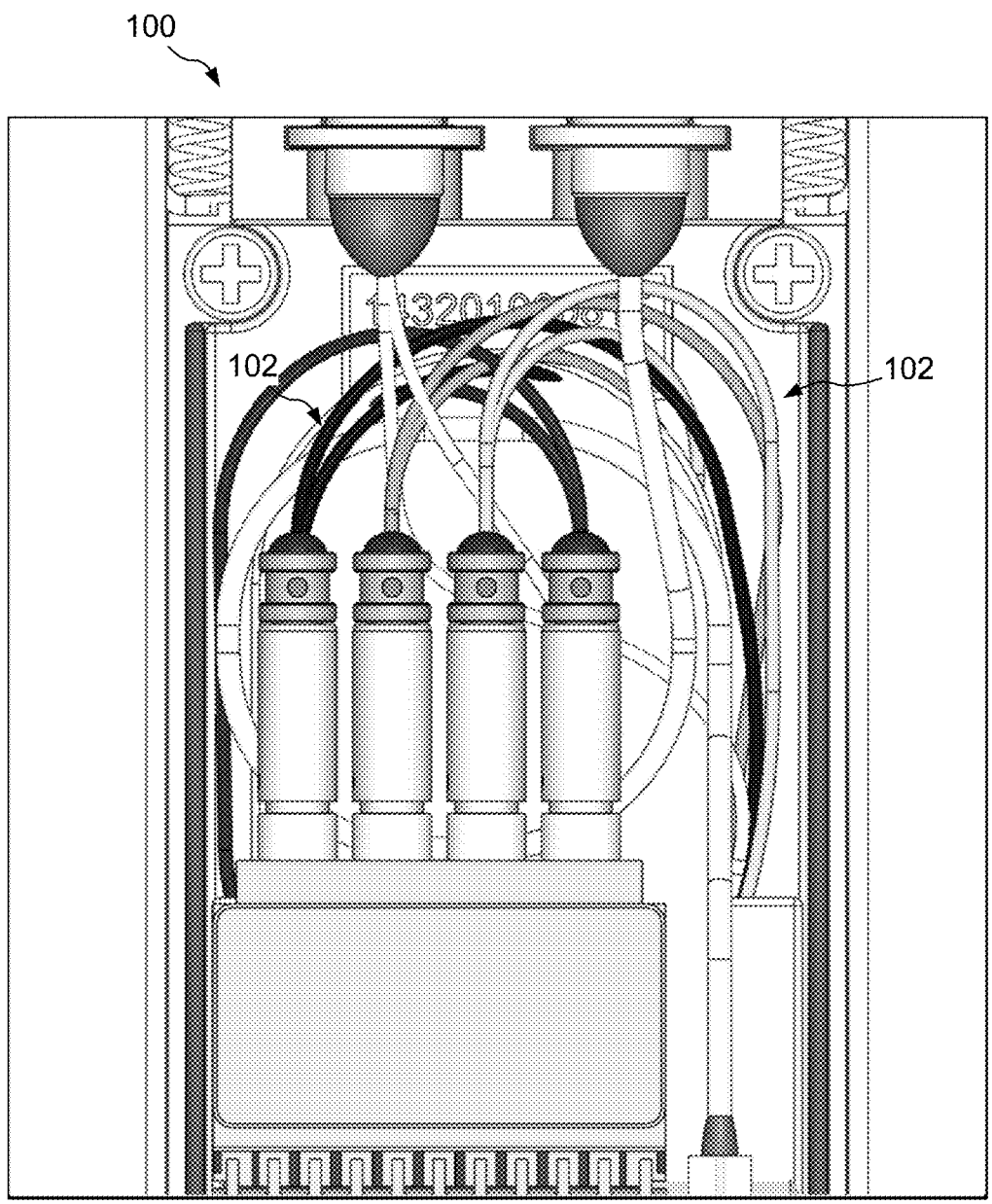
FIG. 1 shows one example approach to routing intermediate optical fibers between components within an optical transceiver housing.

However, routing of optical fiber within a housing, such as housings that comport with small form-factor (SFF) standards, often require some amount of fiber bending to route and couple optical fibers with components such as those provided by TOSAs and ROSAs arrangements. For example, FIG. 1 shows a top view of an example optical transceiver housing 100 and a plurality of intermediate optical fibers 102 routed in a bent/looped fashion to optically couple to components within the optical transceiver housing 100, e.g., such as between laser assemblies, optical multiplexer(s), optical demultiplexer(s), and optical coupling receptacles.

Thus, each intermediate optical fiber of the plurality of intermediate optical fibers 102 include a path or route that necessitates one or more bends. As discussed above, the more acute the bend in an intermediate optical fiber the more significant the change to the refractive index profile associated with the same. For the sake of illustration, consider an example scenario wherein the optical transceiver housing 100 includes a cross-wise width of about 8 mm. This consequently leaves little tolerance to route the plurality of intermediate optical fiber 102 and can lead to damage during manufacturing due to overbending/stress on optical fibers. In addition, the intermediate optical fibers 102 tend to extend/bulge out from the housing during manufacturing in part due to the bends of the optical fibers. This can lead to damage of optical fibers and/or acute fiber bends (e.g., fiber bends with a radius less than a minimum fiber bend radius) as a cover portion (not shown) is attached to the housing and used to compress the plurality of intermediate optical fibers 102. One existing approach to maintaining a fixed position for optical fibers within a housing includes the use of an epoxy/adhesive. However, such epoxies/adhesives can be difficult to work with and, once cured, cannot be easily removed to allow for re-positioning of optical fibers.

Thus, an optical fiber holder is disclosed herein that includes at least one confinement slot for routing intermediate optical fibers within a housing of an optical assembly module, and preferably, a plurality of confinement slots for maintaining a target/nominal fiber bending radius for one or more intermediate optical fibers. The confinement slots of the optical fiber holder may also be referred to herein as confinement grooves or confinement apertures. Preferably, the optical fiber holder is disposed within the housing of an optical subassembly between an optical component, e.g., a TOSA arrangement and/or ROSA arrangement, and optical coupling receptacles, e.g., LC coupling receptacles, for optically coupling with external fibers for sending and/or receiving optical signals.

In one specific, non-limiting example, the optical subassembly module is a SFF pluggable (SFFP) optical transceiver module having a housing with a multi-channel TOSA and ROSA arrangement disposed therein. The TOSA arrangement includes a plurality of laser assemblies and a multiplexer for outputting an optical signal having a plurality of different channel wavelengths, e.g., a wavelength division multiplexed signal, on to an external transmit optical fiber by way of an optical coupling receptacle provided by the housing, e.g., an LC-type coupling receptacle. Further, the ROSA arrangement includes a demultiplexer and is optically coupled to an external receive optical fiber by way of an optical coupling receptacle provided by the housing, e.g., an LC-type coupling receptacle, to receive a multiplexed optical signal and separate the same into individual wavelengths for detection purposes. A plurality of intermediate optical fibers are disposed (entirely) within the housing and optically couple the plurality of laser assemblies of the TOSA arrangement to a multiplexer, and optically couple an output of the multiplexer to a corresponding optical coupling receptacle. Likewise, the plurality of intermediate optical fibers optically couple an input of the demultiplexer of the ROSA arrangement to a corresponding optical receptacle.

Continuing the above example, the housing further includes an optical fiber holder consistent with the present disclosure preferably disposed between the optical coupling receptacles and the TOSA and ROSA arrangements. More preferably, the optical fiber holder is disposed proximate to the end of the housing having the optical coupling receptacles, which may also be referred to herein as an optical coupling end of the housing. The optical fiber holder includes a body that preferably defines at least two confinement slots which are disposed at a predetermined distance relative to each other, with the predetermined distance being based on a minimum bend radius for the plurality of intermediate optical fibers. For instance, in a scenario where the intermediate optical fibers have a minimum bend radius of 10 millimeters (mm), the predetermined distance is at least 10 mm±0.5 mm. Thus, an intermediate optical fiber can be routed along a path through a first confinement slot and looped back towards a second confinement slot such that a bend is formed (See e.g., FIG. 2C) with a bend radius that is at or greater than the associated minimum bend radius. In addition, each of the confinement slots provided by the optical fiber holder preferably allow for optical fibers to be removed even after an intermediate optical fiber is coupled to associated components. In this example, a technician may use a tapered opening of a confinement groove to slide/displace an intermediate optical fiber from a confinement slot to decouple the optical fiber from the optical fiber holder. The technician may then reposition the optical fiber into the same or different confinement slots provided by the optical fiber holder, depending on a desired configuration.

Thus, an optical fiber holder consistent with the present disclosure provides numerous advantageous over other optical fiber routing approaches. For example, an optical fiber holder consistent with the present disclosure may be utilized to keep intermediate optical fibers at a predefined position and to maintain fiber bends at or above an associated minimum bend radius. In addition, the optical fiber holder can include at least four (4) confinement slots in some scenarios to provide two distinct pairs/groups of confinement slots which are disposed at a predetermined distance from each other. The plurality of intermediate optical fibers may then be evenly distributed within a housing of an optical subassembly during manufacturing such that about half of the intermediate optical fibers utilize a first set/pair of confinement slots and the remaining intermediate optical fibers utilize a second set/pair of confinement slots, such as is shown in FIG. 2C. Accordingly, the potential for overcrowding of intermediate optical fibers within a housing is reduced, and thus by extension, the potential for damage to optical fibers through inadvertent contact (e.g., when the lid/cover gets attached to the housing) and/or through acute bends along intermediate optical fibers is minimized or otherwise reduced. Likewise, an optical fiber holder consistent with the present disclosure avoids the necessity of epoxy/adhesive to maintain optical fiber position. Thus, adhesives/epoxy may be entirely eliminated to maintain optical fiber position or otherwise reduced relative to existing approaches that do not utilize an optical fiber holder as disclosed herein.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Figure 2A:
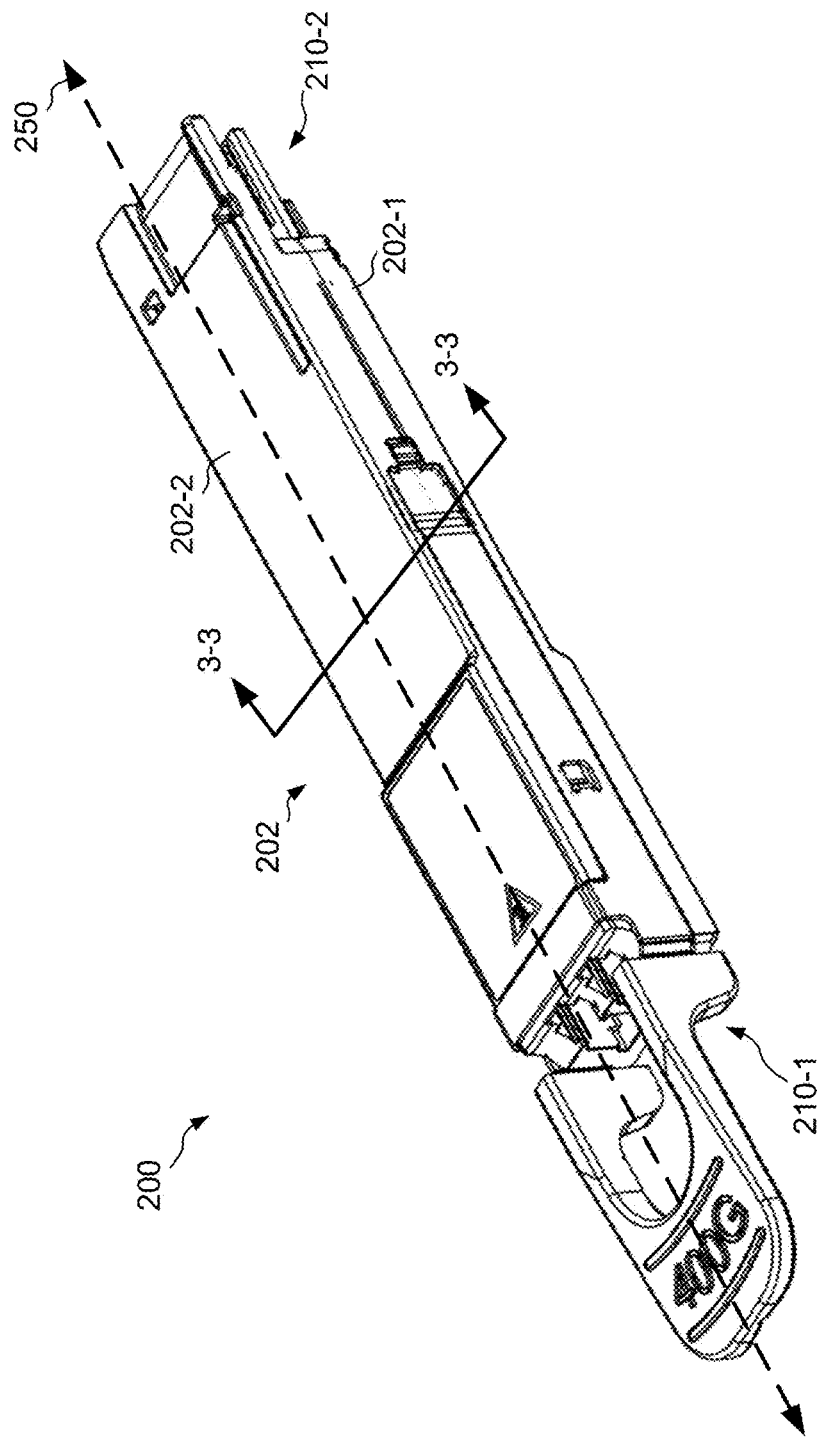
FIG. 2A shows a perspective view of an optical transceiver module consistent with aspects of the present disclosure.
Figure 2B:
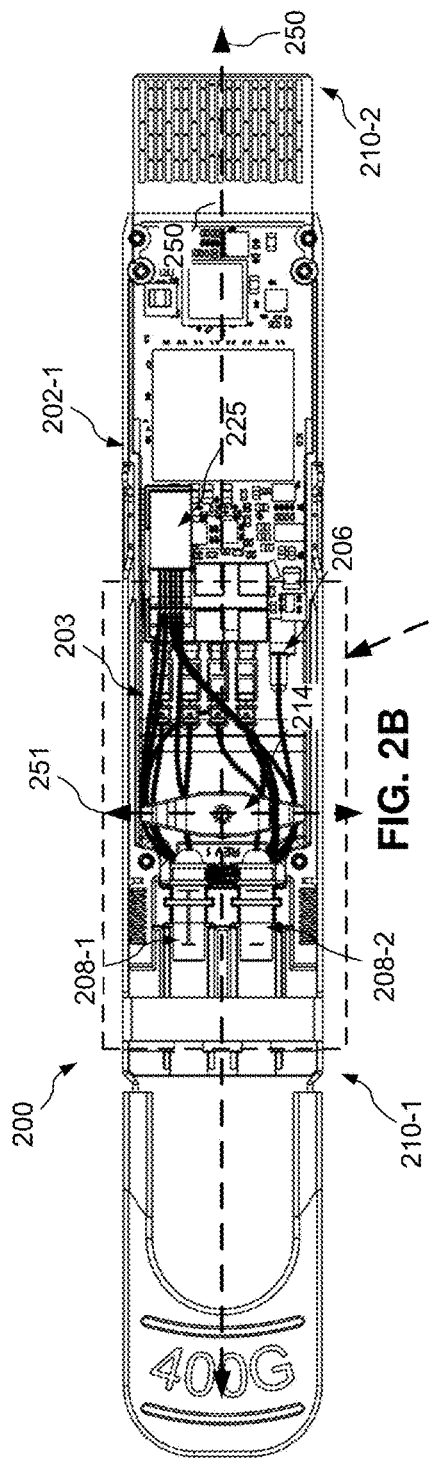
FIG. 2B shows a top view of the optical transceiver module of FIG. 2A consistent with aspects of the present disclosure.
Figure 2C:
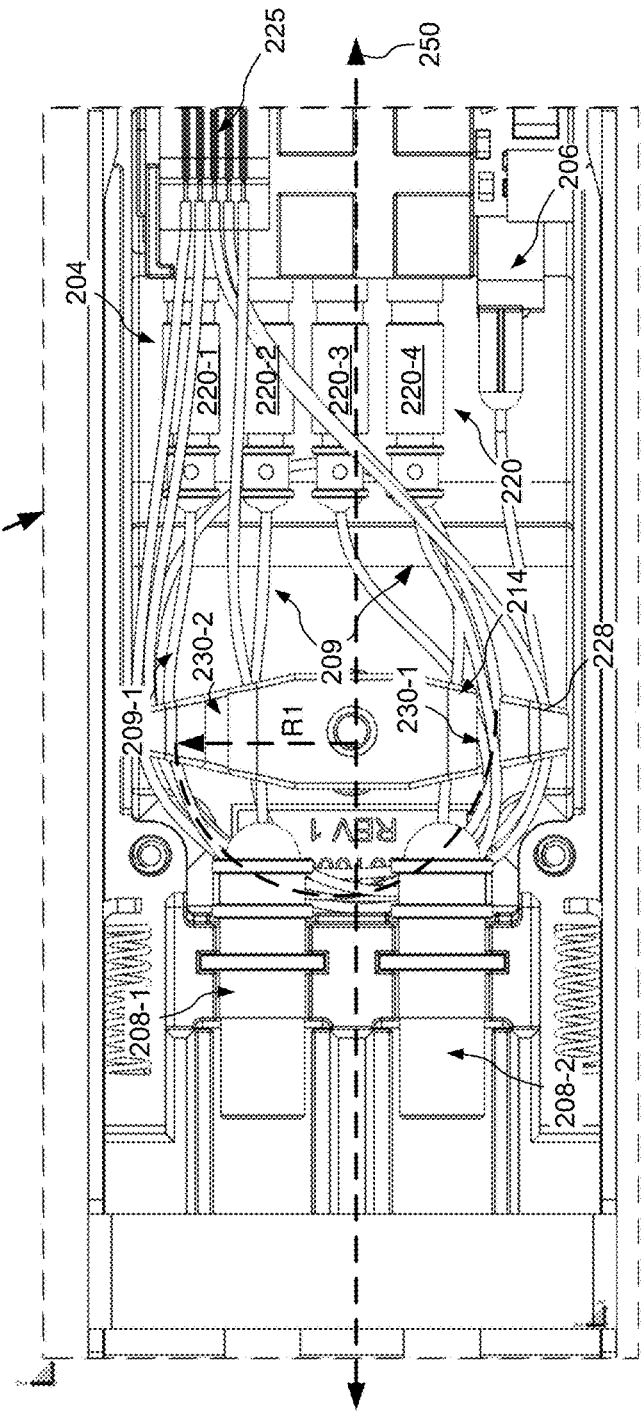
FIG. 2C shows an enlarged portion of the top view of the optical transceiver module shown in FIG. 2B.

With reference to FIGS. 2A-2C, an example optical transceiver module 200 is shown consistent with aspects of the present disclosure. The example optical transceiver module 200 may also be referred to herein as an optical assembly module, optical transceiver, or simply an optical module. In one preferred example, the optical transceiver module 200 is implemented as a multi-channel optical transceiver capable of sending and receiving optical signals having at least four different channel wavelengths. One example implementation of the optical transceiver module 200 is discussed further below with reference to FIG. 6.

The optical transceiver module 200 preferably includes a housing shown collectively at 202 and individually as first and second housing portions 202-1, 202-2, respectively. More preferably, the housing 202 is implemented as an QSFP-DD. The housing 202 may be formed from, for example, a metal or other suitably rigid material.

As shown in FIG. 2A, the housing 202 extends along a longitudinal axis 250 from a first end 210-1 to a second end 210-2. The first end 210-1 includes at least one optical coupling receptacle, such as LC coupling receptacles as shown, for optically coupling to transmit and receive optical fibers, for example. The first end 210-1 may thus also be referred to as an optical coupling end. The second end 210-2 can include an electrical interface, such as a printed circuit board, for electrically coupling to external driving circuitry. Thus, the second end 210-2 may also be referred to herein as an electrical coupling end.

The housing 202 further preferably includes first and second housing portions 202-1, 202-2 configured to couple together and form a cavity 203 therebetween (See FIG. 2B). The cavity 203 is preferably configured to include at least one optical component such as a transmitter optical subassembly (TOSA) arrangement, receiver optical subassembly (ROSA) arrangement, or both as is discussed further below.

With specific reference to FIGS. 2B-2C, example views of the optical transceiver module 200 are shown consistent with aspects of the present disclosure. As shown, the example optical transceiver module 200 includes first and second optical coupling receptacles 208-1, 208-2 disposed proximate the first end 210-1 of the housing 202 (See also FIG. 2A). Each of the first and second optical coupling receptacles 208-1, 208-2 are preferably implemented as LC receptacles configured to couple to external transmit and receive fibers (not shown) by way of fiber ferrules.

The optical transceiver module 200 further preferably includes at least one optical component. The at least one optical component optically couples to the first or second optical coupling receptacle 208-1, 208-2 by way of an intermediate optical fiber of a plurality of intermediate optical fibers 209. Each intermediate optical fiber of the plurality of intermediate optical fibers 209 is preferably implemented as a single mode optical fiber (SMF) with a minimum bend radius of 10 mm. Each intermediate optical fiber of the plurality of intermediate optical fibers 209 is preferably routed through an optical fiber holder 214 to maintain the minimum bend radius for the plurality of intermediate optical fibers 209 and to simplify manufacture of the optical transceiver module 200, as is discussed in greater detail below.

As shown, the optical transceiver module 200 preferably includes a TOSA arrangement 204 and a ROSA arrangement 206. The TOSA arrangement 204 is preferably disposed at a midpoint of the housing 202 and includes a plurality of laser assemblies shown collectively at 220 and individually at 220-1 to 220-4 that each output a different associated channel wavelength. Each laser assembly of the plurality of laser assemblies 220 is preferably implemented with an electro-absorption modulated laser (EML) and supporting circuitry. More preferably, each laser assembly of the plurality of laser assemblies 220 is implemented as an uncooled EML laser that does not include the use of a temperature control device, such as a thermoelectric cooler (TEC), to maintain a local temperature for each laser.

The TOSA arrangement 204 also preferably includes a multiplexer 225 implemented as an arrayed waveguide grating (AWG), although other types of optical multiplexers are within the scope of this disclosure. Preferably each laser assembly of the plurality of laser assemblies 220 optically couple to an input of the multiplexer 225 by way of an associated intermediate optical fiber of the plurality of intermediate optical fibers 209. Likewise, an output of the multiplexer 225 optically couples to the first optical coupling receptacle 208-1 by way of an intermediate optical fiber of the plurality of intermediate optical fibers 209. Likewise, the ROSA arrangement 206 preferably optically couples to the second optical coupling receptacle 208-2 by way of an intermediate optical fiber of the plurality of intermediate optical fibers 209.

As further shown, the optical transceiver module 200 further preferably includes the optical fiber holder 214 disposed within the cavity 203. The optical fiber holder 214 is preferably disposed between the first and second optical coupling receptacles 208-1, 208-2 and at least one optical component such as the TOSA arrangement 204 and/or ROSA arrangement 206. More preferably, the optical fiber holder 214 is disposed proximal to the first end 210-1 of the housing 202 and distal relative to the second end 210-2 of the housing 202.

The optical fiber holder 214 further preferably includes a body 228 that extends along a longitudinal axis 251. More preferably, the longitudinal axis 251 of the body 228 extends substantially transverse relative to the longitudinal axis 250 of the housing 202. Preferably, the optical fiber holder 214 is formed of performance thermoplastic elastomer (TPE) or a conductive metal which can be used to reduce electromagnetic interference.

As further shown, the optical fiber holder 214 preferably includes at least one confinement slot, and more preferably, a plurality of confinement slots. The confinement slot(s) are preferably configured to receive at least one intermediate optical fiber of the plurality of intermediate optical fibers 209.

Figure 3:
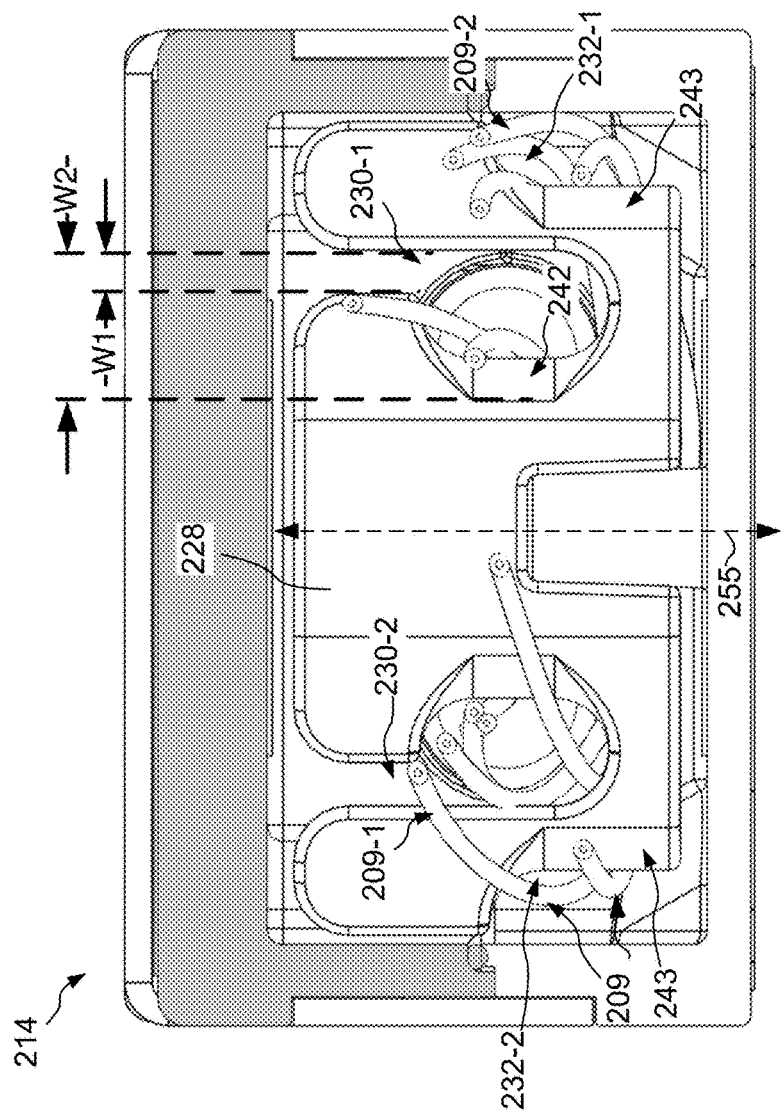
FIG. 3 shows a cross-sectional view of the optical transceiver module of FIG. 2A taken along line 3-3.

For example, and as shown more clearly in the cross-sectional view of FIG. 3 taken along line 3-3 of FIG. 2A, the body 228 includes first and second inner confinement slots 230-1, 230-2 and first and second outer confinement slots 232-1, 232-2. The first and second inner confinement slots 230-1, 230-2 are preferably disposed along the body 228 at a predetermined distance relative to each other/center line 255. Likewise, the first and second outer confinement slots 232-1, 232-2 are disposed opposite each other at distal ends of the body 228 along the longitudinal axis 251 (See FIG. 2B) and are preferably disposed an equal distance from the center line 255. In this example of FIG. 3, the first inner confinement slot 230-1 and first outer confinement slot 232-1 are disposed adjacent to each other and the second inner confinement slot 230-2 and the second outer confinement slot 232-2 are disposed adjacent to each other.

Figure 5A:
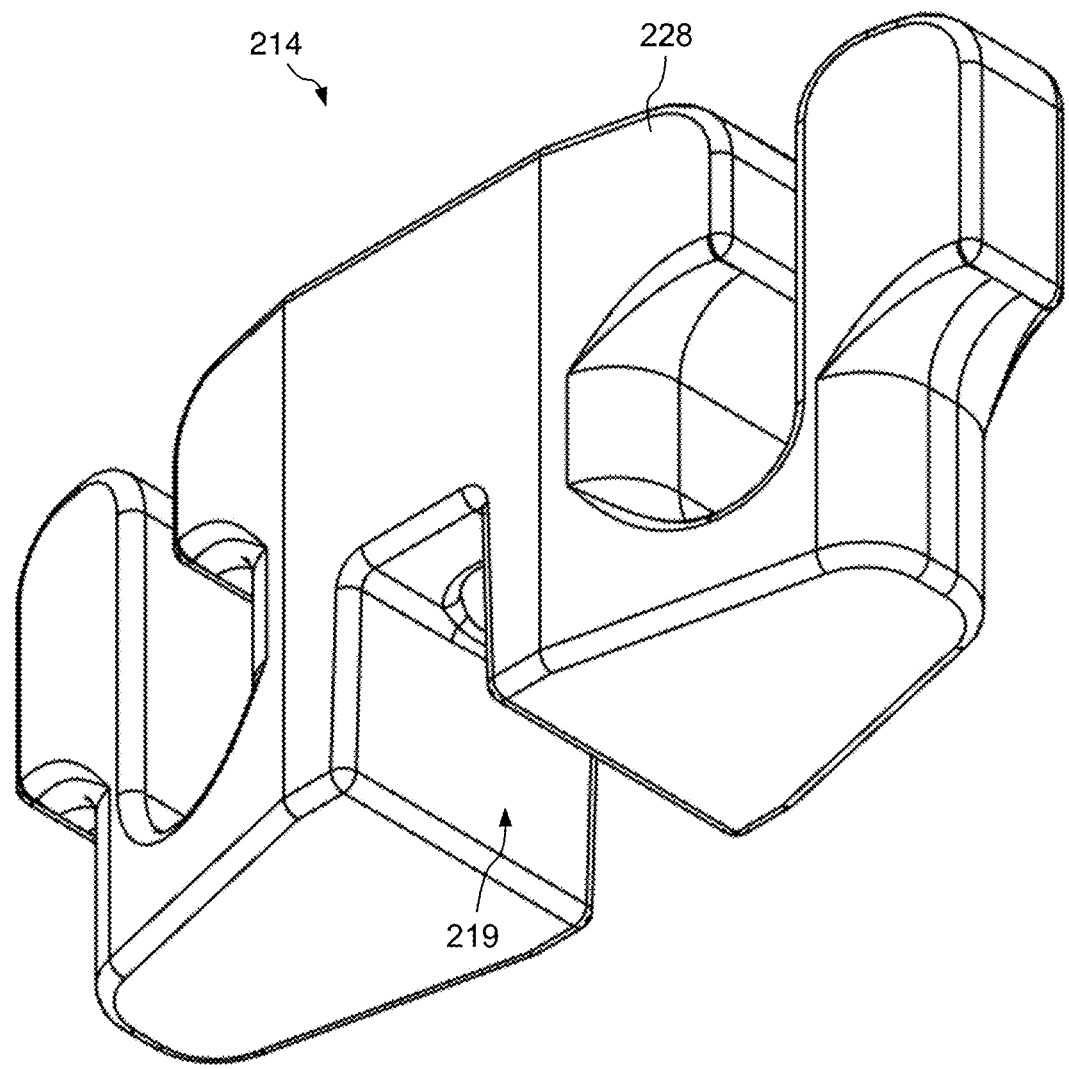
FIG. 5A shows a perspective view of an optical fiber holder consistent with aspects of the present disclosure.
Figure 5B:
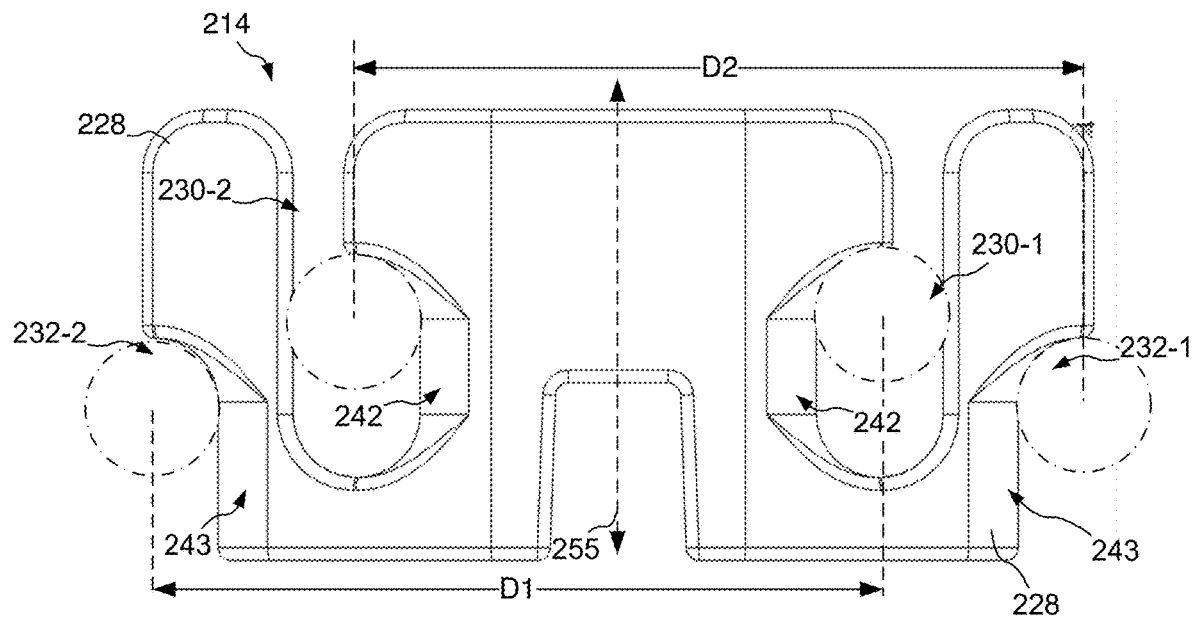
FIG. 5B shows a side view of the optical fiber holder of FIG. 5A, consistent with aspects of the present disclosure.

More preferably, and as shown more clearly in FIG. 5B, the first inner confinement slot 230-1 is disposed at first predetermined distance relative to the second outer confinement slot 232-2. In one example, the first predetermined distance may be measured as a first center to center distance D1 measured between the center of each confinement slot, as shown. The first center to center distance D1 may be predetermined based on the type of intermediate optical fiber used to implement the plurality of intermediate optical fibers 209, and more particularly, based on the minimum bend radius for the same. For example, the minimum bend radius for each intermediate optical fiber of the plurality of intermediate optical fibers 209 may be 10±0.5 mm. The first center to center distance D1 may then be preferably at least 10 mm, and more preferably greater than 10 mm such as 11±0.5 mm. In one specific non-limiting example, the slot center to center distance D1 is equal to 11.43 mm.

In addition, the second inner confinement slot 230-2 is disposed at a second predetermined distance relative to the first outer confinement slot 232-1. In one example, the second predetermined distance may be measured as a second center to center distance D2 measured between the center of each confinement slot, as shown. The second center to center distance D2 is also preferably predetermined based on the type of intermediate optical fiber used to implement the plurality of intermediate optical fibers 209, and more particularly, based on the minimum bend radius for the same. In the prior example, the minimum bend radius for each intermediate optical fiber of the plurality of intermediate optical fibers 209 was 10±0.5 mm. Accordingly, the second center to center distance D2 may then also be preferably at least 10 mm, and more preferably greater than 10 mm such as 11±0.5 mm. In one specific non-limiting example, the second center to center distance D2 is also equal to 11.43 mm. Note, in some cases the first and second center to center distances D1/D2 may not necessarily be equal, and may vary based on, for example, two or more different fiber types and associated minimum bend radiuses.

Continuing, the body 228 of the optical fiber holder 214 further preferably includes a symmetric/mirror profile such that the body 228 includes two substantially identical portions if cut/severed along the center line 255, with the center line 255 extending transverse relative to the longitudinal axis 251 of the body 228 (See FIG. 2B).

Returning to FIG. 3, and with additional reference to FIG. 5B, the first and second inner confinement slots 230-1, 230-2 preferably include a tapered opening having a first overall width W1 that transitions to a second overall width W2, with the second overall width W2 being greater than the first overall width W1. The first and second inner confinement slots 230-1, 230-2 also preferably include chamfered surfaces 242 to reduce stress/friction with the intermediate optical fibers of the plurality of intermediate optical fibers 209 that extend through the first and second inner confinement slots 230-1, 230-2. Intermediate optical fibers may then be disposed within the first and second inner confinement slots 230-1, 230-2 via the tapered openings and confined/constrained within the confinement slots to reduce fiber movement/shift and the potential for damage of the intermediate optical fibers. Likewise, the first and second outer confinement slots 232-1, 232-2, also preferably include chamfered surfaces 243 to reduce fiber wear/friction.

The first predetermined distance between the first inner confinement slot 230-1 and the second outer confinement slot 232-2, and the second predetermined distance between the second inner confinement slot 230-2 and the first outer confinement slot 232-1, as discussed above, may be advantageously utilized to maintain a target minimum fiber bend radius for each of the plurality of intermediate optical fibers 209. This configuration may thus be accurately described as providing a plurality of confinement slot groups/pairings, whereby each pairing/group includes two confinement slots disposed at a predetermined distance from each other.

In one preferred example, a first intermediate optical fiber of the plurality of intermediate optical fibers 209 extends through the first inner confinement slot 230-1 and loop/bend back towards the optical fiber holder 214 and then ultimately extends through the second outer confinement slot 232-2. The first intermediate optical fiber may then include a bend that is maintained at or above an associated minimum bend radius by virtue of the distance between the first inner confinement slot 230-1 and the second outer confinement slot 232-2. A second intermediate optical fiber of the plurality of intermediate optical fibers 209 may likewise extend through the second inner confinement slot 230-2 and loop/bend back towards the optical fiber holder 214 and ultimately extend through the first outer confinement slot 232-1. A bend of the second intermediate optical fiber of the plurality of intermediate optical fibers 209 may also be maintained at or above an associated minimum bend radius by virtue of the distance between the second inner confinement slot 230-2 and the first outer confinement slot 232-1.

Some aspects of the present disclosure may be better understood by illustration. As shown in FIG. 2C, a first intermediate optical fiber 209-1 of the plurality of intermediate optical fibers 209 extends through the first inner confinement slot 230-1 and loops back towards the optical fiber holder 214 and then extends through the second outer confinement slot 232-2 (See FIG. 3) resulting in a bend with a bend radius R1 (See FIG. 2C). As shown, this preferably includes the first intermediate optical fiber 209-1 extending through the optical fiber holder 214, and more particularly the first inner confinement slot 230-1 and the second outer confinement slot 232-2, along a path/axis which is substantially parallel with the longitudinal axis 250 of the housing.

The resulting bend radius R1 for the first intermediate optical fiber 209-1 is preferably maintained by the optical fiber holder 214 at or greater than a minimum bend radius associated with the first intermediate optical fiber 209-1. For example, the minimum bend radius for the first intermediate optical fiber 209-1 may be 10±0.5 mm, and the resulting bend radius R1 may thus be at least 10 mm, and more preferably at least 11 mm, based on the predetermined distance between the first inner confinement slot 230-1 and the second outer confinement slot 232-2.

In one preferred example, and as shown in FIGS. 2B and 2C, the plurality of intermediate optical fibers 209 are divided substantially equally between the pairs/groups of confinement slots provided by the optical fiber holder 214 withing the housing 202. For example, about half the total optical fibers of the intermediate optical fibers 209 (±2-3 optical fibers depending on a desired configuration) are routed through the first inner confinement slot 230-1 and the second outer confinement slot 232-2 and include a bend maintained at or above a target minimum bend radius based at least in part on the first predetermined distance between the first inner confinement slot 230-1 and the second outer confinement slot 232-2. In addition, the remaining intermediate optical fibers of the plurality of intermediate optical fibers 209 are routed through the second inner confinement slot 230-2 and the first outer confinement slot 232-1 and include a bend maintained at or above a target minimum bend radius based at least in part on the second predetermined distance between the second inner confinement slot 230-2 and the first outer confinement slot 232-1.

Thus, in the preferred example of FIGS. 2B-2C, the plurality of intermediate optical fibers 209 may be distributed in a relatively even manner such that the overall density of optical fibers is distributed in an even and organized manner between halves of the housing 202, e.g., evenly distributed on either side of an imaginary center line drawn along the longitudinal axis 250. This may advantageously ensure that the plurality of intermediate optical fibers 209 are organized and distributed in a manner that reduces the potential for damage. In addition, the optical fiber holder 214 further preferably holds/maintains the plurality of intermediate optical fibers 209 (entirely) within a cavity defined by the first housing portion 202-1. Accordingly, the second housing portion 202-2 may then be attached/coupled to the first housing portion 202-1 without compressing/displacing the plurality of intermediate optical fibers 209.

Figure 4A:
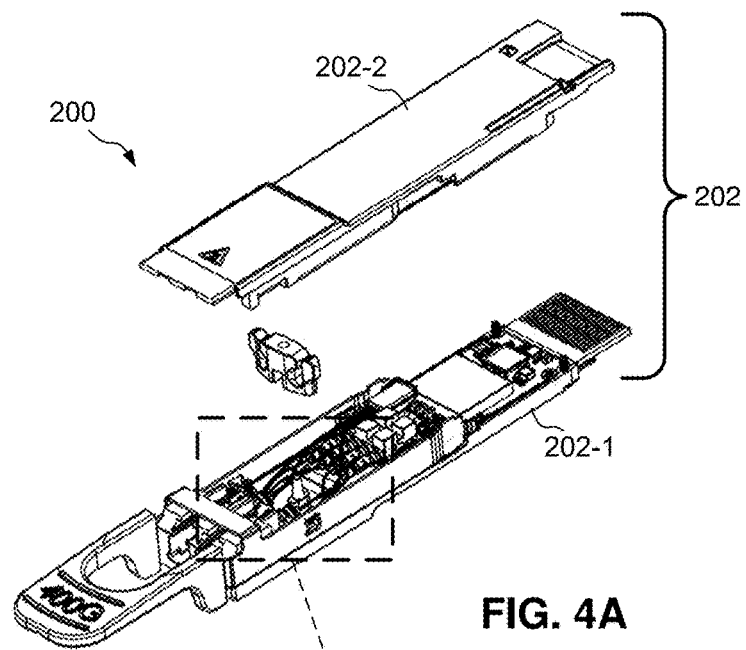
FIG. 4A shows the optical transceiver module of FIG. 2A partially exploded, in accordance with aspects of the present disclosure.
Figure 4B:
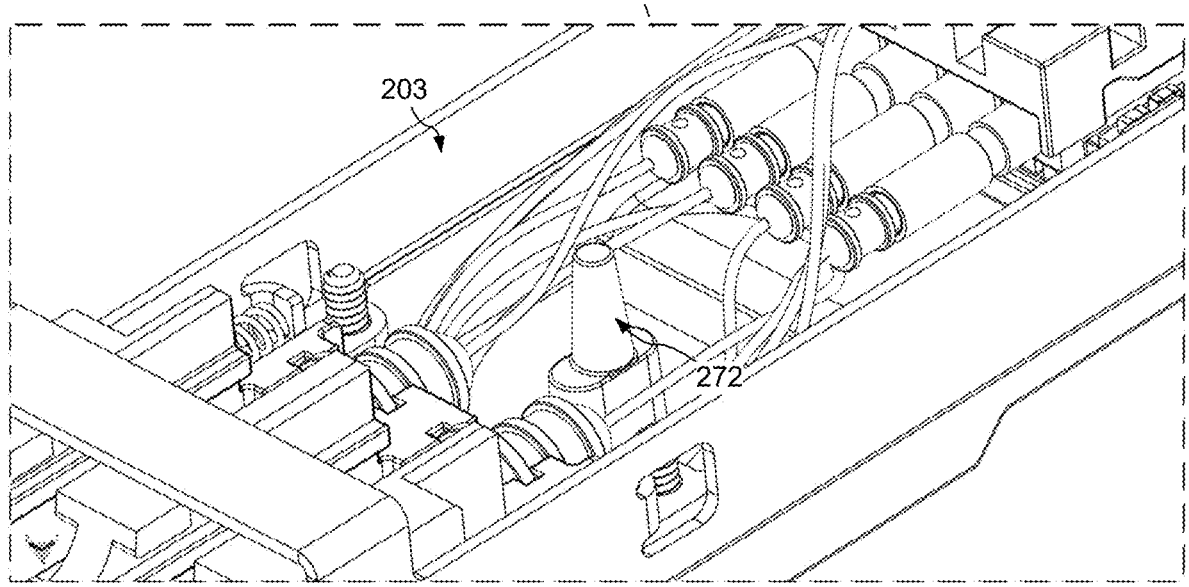
FIG. 4B shows an enlarged portion of the optical transceiver module of FIG. 4A.

Turning to FIGS. 4A-4B the example optical transceiver module 200 is shown partially exploded. As shown, the second housing portion 202-1 preferably includes a projection 272 disposed within the cavity 203 for alignment and coupling of the optical fiber holder 214. The projection 272 preferably extends from a base surface of the first housing portion 202-1 towards the second housing portion 202-2, when second housing portion 202-2 is coupled to the first housing portion 202-1. The projection 272 further preferably includes a tapered portion based on, for example, a base that transitions to a frustoconical portion. The projection 272 is also preferably disposed between the first and second optical coupling receptacles 208-1, 208-2 and the at least one optical component, e.g., the TOSA arrangement 204 and/or the ROSA arrangement 206 (See FIG. 2B), and more preferably, proximal to the first and second optical coupling receptacles 208-1, 208-2 and distal from the at least one optical component.

As shown in FIG. 5A, the optical fiber holder 214 preferably includes a mating slot 219 for receiving the projection 272. The mating slot 219 preferably includes a profile that generally corresponds with the profile of the projection 272. More preferably, the mating slot 219 includes dimensions that are equal to or less than the outer dimensions of the projection 272 such that an interference/friction fit gets formed when the projection 272 extends into the mating slot 219. The mating slot 219 also preferably includes a shape/profile that ensures that the optical fiber holder 214 couples to the housing 202 via the projection 272 in a single orientation, with the single orientation preferably including the longitudinal axis 251 of the optical fiber holder 214 extending substantially transverse relative to the longitudinal axis 250 of the housing 202 (see FIG. 2B).

Figure 5C:
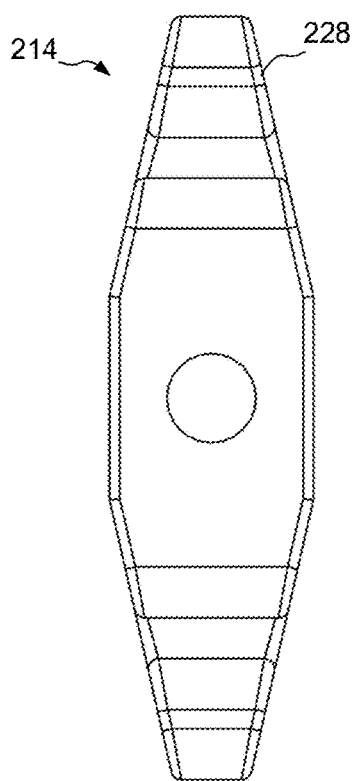
FIG. 5C shows a top view of the optical fiber holder of FIG. 5A, consistent with aspects of the present disclosure.
Figure 5D:
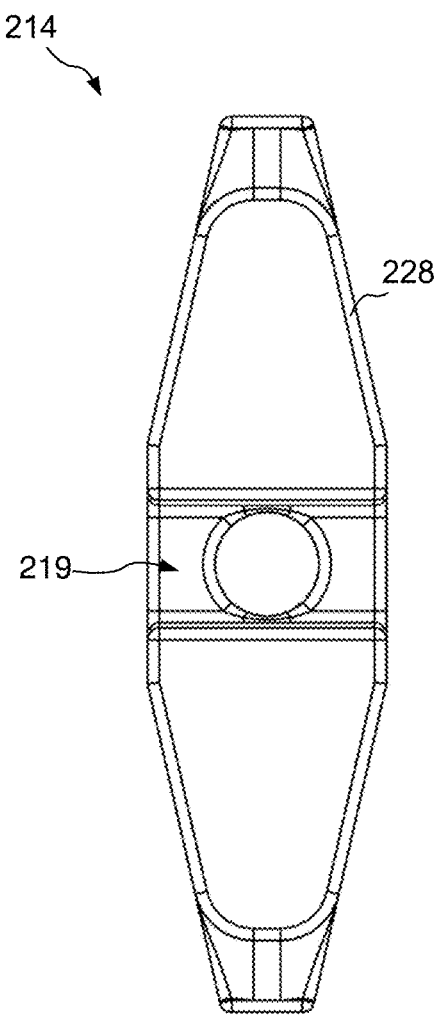
FIG. 5D shows a bottom view of the optical fiber holder of FIG. 5A, consistent with aspects of the present disclosure.

FIGS. 5A-5D collectively show the optical fiber holder 214 in isolation. In particular. FIG. 5A shows a perspective view of the optical fiber holder 214; FIG. 5B shows a side view of the optical fiber holder 214; FIG. 5C shows a top view of the optical fiber holder; and FIG. 5D shows a bottom view of the optical fiber holder 214.

Figure 6:
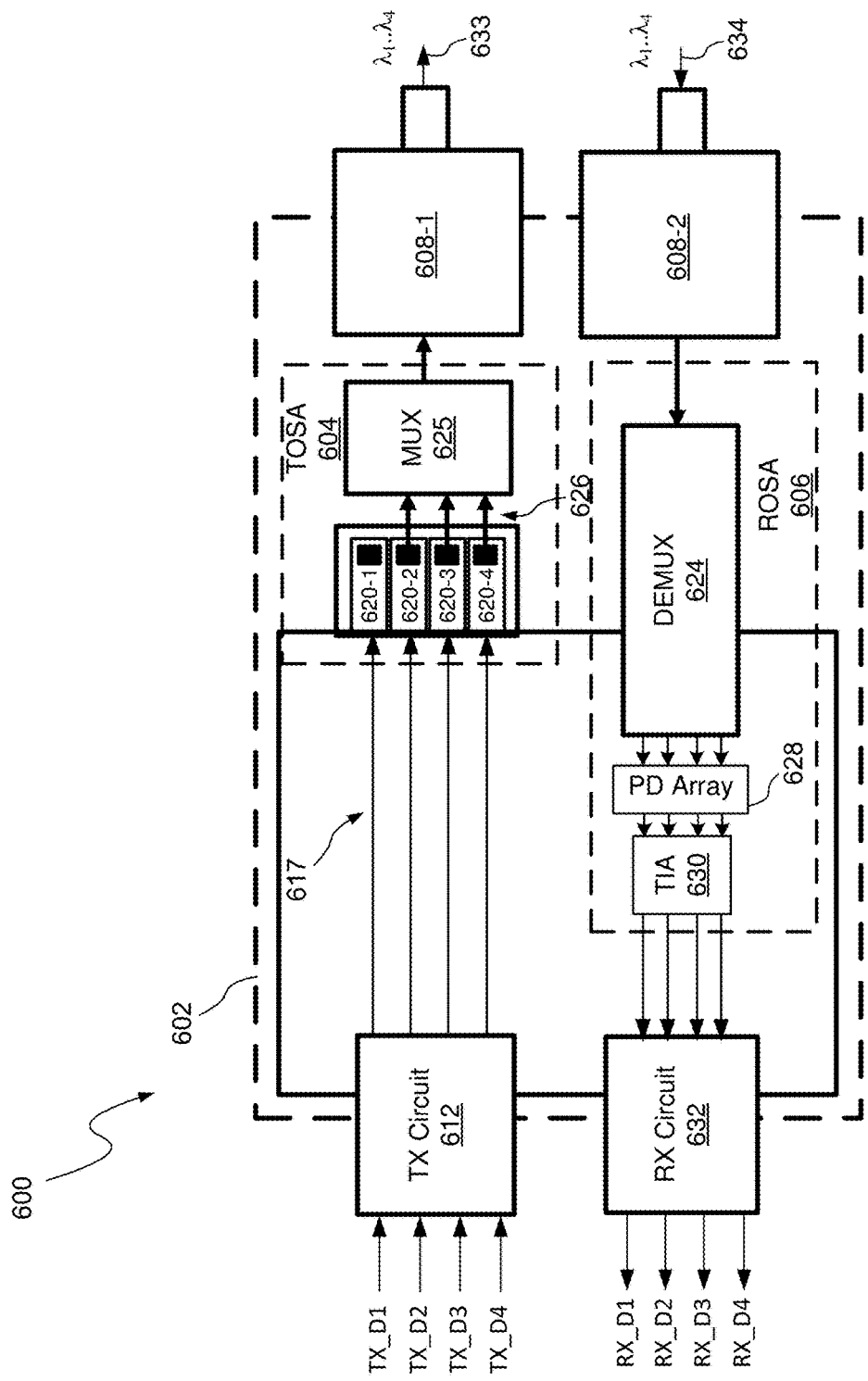
FIG. 6 shows an example block diagram of an optical transceiver system consistent with aspects of the present disclosure.

Turning to FIG. 6, an optical transceiver system 600, consistent with aspects of the present disclosure is shown. As shown, the optical transceiver system 600 transmits and receives four (4) channels using four different channel wavelengths ($\lambda 1$, $\lambda 2$, $\lambda 3$, $\lambda 4$) and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver system 600 may also be capable of transmission distances of 2 km to at least about 10 km. The optical transceiver system 600 may be used, for example, in internet data center applications or fiber to the home (FTTH) applications.

Preferably, the optical transceiver system 600 includes a housing 602 configured consistent with aspects of the present disclosure. For example, the housing 602 may be implemented as the housing 202 of the optical transceiver module 200 discussed above.

As shown, optical transceiver system 600 includes a transmitter optical subassembly (TOSA) arrangement 604 having a plurality of laser arrangements 620-1 to 620-4 for transmitting optical signals on different channel wavelengths and a multi-channel receiver optical subassembly (ROSA) 606 for receiving optical signals having multiple different channel wavelengths. The multi-channel ROSA 606 may also be referred to herein as a ROSA arrangement. The TOSA arrangement 604 and the multi-channel ROSA 606 are preferably located within the housing 602.

As further shown, the optical transceiver system 600 includes a transmit connecting circuit 612 and a receive connecting circuit 632 that provide electrical connections to the TOSA arrangement 604 and the multi-channel ROSA 606, respectively, within the housing 602. The transmit connecting circuit 612 is electrically connected to the electronic components in each of the laser arrangements 620-1 to 620-4 and the receive connecting circuit 632 is electrically connected to the electronic components (e.g., photodiodes, TIA(s), etc.) in the multi-channel ROSA 606. The transmit connecting circuit 612 and the receive connecting circuit 632 may be flexible printed circuits (FPCs) including at least conductive paths to provide electrical connections and may also include additional circuitry. Preferably, the transmit and receive connecting circuits 612, 632 are implemented at least in part in on a printed circuit board.

The TOSA arrangement 604 preferably electrically couples to the transmit connecting circuit 612 via electrically conductive paths 617 and is configured to receive driving signals (e.g., TX_D1 to TX_D4) and launch channel wavelengths 626 on to fiber(s) of the external transmit optical fiber 633 via multiplexing device 625 and the first optical coupling port 608-1.

Continuing on, the example multi-channel ROSA 606 shown in FIG. 6 includes a demultiplexer 624 optically coupled to the second optical coupling port 608-2 to receive an optical signal having a plurality of multiplexed channel wavelengths via the external receive optical fiber 634. An output of the demultiplexer 624 is optically coupled to a photodiode array 628. The multi-channel ROSA 606 also includes a transimpedance amplifier 630 electrically connected to the photodiode array 628. The photodiode array 628 and the transimpedance amplifier 630 detect and convert optical signals received from the demultiplexer 624 into electrical data signals (RX_D1 to RX_D4) which are output via the receive connecting circuit 632.

In accordance with another aspect an optical module is disclosed. The optical module comprising a housing having an optical coupling end for coupling to at least one optical fiber and an electrical coupling end for electrically coupling to external circuitry, a first optical coupling receptacle disposed at the optical coupling end of the housing, a first optical component disposed within the housing, a first intermediate optical fiber having a first end optically coupled to the first optical component and a second end optically coupled to the first optical coupling receptacle, an optical fiber holder disposed within the housing, the optical fiber holder defining at least first and second confinement slots disposed at a first predetermined distance from each other, and wherein the first intermediate optical fiber extends through the first and second confinement slots of the optical fiber holder such that a bend is formed along the first intermediate optical fiber.

In accordance with another aspect of the present disclosure a multi-channel optical transceiver is disclosed. The multi-channel optical transceiver including a housing having an optical coupling end and an electrical coupling end, first and second optical coupling receptacles disposed at the optical coupling end of the housing, an optical fiber holder disposed in the housing, a multi-channel receiver optical subassembly (ROSA) arrangement disposed in the housing, a multi-channel transmitter optical subassembly (TOSA) arrangement disposed in the housing, a plurality of intermediate optical fibers disposed in the housing for optically coupling an output of the TOSA arrangement to the first optical coupling receptacle and optically coupling an input of the ROSA arrangement to the second optical coupling receptacle, and wherein each intermediate optical fiber of the plurality of intermediate optical fibers extend through the optical fiber holder along a path that introduces a fiber bend.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical module comprising:
   a housing having an optical coupling end for coupling to at least one optical fiber and an electrical coupling end for electrically coupling to external circuitry;
   at least first and second optical components disposed within the housing;
   an optical fiber holder disposed within the housing, the optical fiber holder defining at least first and second inner confinement slots and at least first and second outer confinement slots outside of the inner confinement slots, wherein the first inner confinement slot and the first outer confinement slot are located on a first side of a center line of the housing and the second inner confinement slot and the second outer confinement slot are located on a second side of the center line of the housing;
   at least first and second intermediate optical fibers disposed within the housing and optically coupled respectively to the first and second optical components;
   wherein the first intermediate optical fiber extends through the first inner confinement slot and the second outer confinement slot, and wherein the first inner confinement slot and the second outer confinement slot are spaced at a distance such that a bend formed along the first intermediate optical fiber is at or above a minimum bend radius associated with the first intermediate optical fiber;
   wherein the second intermediate optical fiber extends through the second inner confinement slot and the first outer confinement slot, and wherein the second inner confinement slot and the first outer confinement slot are spaced at a distance such that a bend formed along the second intermediate optical fiber is at or above a minimum bend radius associated with the second intermediate optical fiber; and
   wherein portions of the optical fiber holder extend above each of the first and second inner confinement slots and the first and second outer confinement slots to hold down the first and second intermediate optical fibers to maintain the first and second intermediate optical fibers in a portion of the housing.

2. The optical module of claim 1, wherein the optical coupling end and the electrical coupling end are disposed along a first longitudinal axis of the housing, and wherein the optical fiber holder includes a body that extends along a second longitudinal axis, the first and second longitudinal axes being substantially transverse relative to each other.

3. The optical module of claim 2, wherein the first and second intermediate optical fibers extend through the confinement slots along an axis which is substantially parallel with the first longitudinal axis of the housing.

4. The optical module of claim 1, wherein the optical fiber holder is disposed proximal to the optical coupling end and distal relative to the electrical coupling end of the housing.

5. The optical module of claim 1, wherein the first and second inner confinement slots include a tapered opening having a first width W1 that transitions to a second width W2, the second width W2 being greater than the first width W1.

6. The optical module of claim 5, wherein the first and second outer confinement slots are disposed at ends of the optical fiber holder.

7. The optical module of claim 1, wherein the first and second optical components comprise a transmitter optical subassembly (TOSA) arrangement and a receiver optical subassembly (ROSA) arrangement.

8. The optical module of claim 7, wherein the TOSA arrangement includes a plurality of electro-absorption modulated lasers (EMLs).

9. The optical module of claim 1, further comprising a projection extending from a base of the housing and received in a mating slot in the optical fiber holder with a friction fit.

10. The optical module of claim 9, wherein the projection includes a tapered portion.

11. The optical module of claim 9, wherein the projection includes a base having a shape that allows the optical fiber holder to have only a single orientation in the housing.

12. The optical module of claim 11, wherein the projection includes a tapered portion extending from the base.

13. The optical module of claim 1, wherein the housing includes first and second housing portions, wherein the optical fiber holder is mounted in the first housing portion, and wherein the portions of the optical fiber holder above each of the first and second inner confinement slots and the first and second outer confinement slots hold down the first and second intermediate optical fibers such that the first and second intermediate optical fibers are maintained within the first housing portion.

14. A multi-channel optical transceiver comprising:
    a housing having an optical coupling end and an electrical coupling end;
    an optical fiber holder disposed in the housing, the optical fiber holder defining at least first and second inner confinement slots and at least first and second outer confinement slots outside of the inner confinement slots, wherein the first inner confinement slot and the first outer confinement slot are located on a first side of a center line of the housing and the second inner confinement slot and the second outer confinement slot are located on a second side of the center line of the housing;
a multi-channel receiver optical subassembly (ROSA) arrangement disposed in the housing;
a multi-channel transmitter optical subassembly (TOSA) arrangement disposed in the housing;
a plurality of intermediate optical fibers disposed in the housing, wherein a first intermediate optical fiber is optically coupled to an output of the TOSA arrangement and wherein a second intermediate optical fiber is optically coupled to an input of the ROSA arrangement;
wherein the first intermediate optical fiber extends through the first inner confinement slot and the second outer confinement slot, and wherein the first inner confinement slot and the second outer confinement slot are spaced at a distance such that a bend formed along the first intermediate optical fiber is at or above a minimum bend radius associated with the first intermediate optical fiber;
wherein the second intermediate optical fiber extends through the second inner confinement slot and the first outer confinement slot, and wherein the second inner confinement slot and the first outer confinement slot are spaced at a distance such that a bend formed along the second intermediate optical fiber is at or above a minimum bend radius associated with the second intermediate optical fiber; and
wherein portions of the optical fiber holder extend above each of the first and second inner confinement slots and the first and second outer confinement slots to hold down the first and second intermediate optical fibers to maintain the first and second intermediate optical fibers in a portion of the housing.

15. The multi-channel optical transceiver of claim 14, further comprising a projection extending from the housing into a receptacle defined by the optical fiber holder such that a friction fit is formed between the projection and the optical fiber holder.

16. The multi-channel optical transceiver of claim 15, wherein the projection includes a frustoconical portion for forming a friction fit with the optical fiber holder.

17. The multi-channel optical transceiver of claim 14, wherein the housing includes a first longitudinal axis and the optical fiber holder includes a second longitudinal axis, the first and second longitudinal axes extending substantially transverse relative to each other.

18. The multi-channel optical transceiver of claim 14, wherein the housing includes first and second housing portions configured to couple to each other, and wherein the optical fiber holder maintains the plurality of intermediate optical fibers entirely within the first housing portion.

* * * * *